United States Patent
Chou et al.

(10) Patent No.: US 8,645,467 B2
(45) Date of Patent: *Feb. 4, 2014

(54) SYSTEM AND METHOD OF ENHANCED COLLABORATION THROUGH TELEPORTATION

(71) Applicant: Avaya Inc., Basking Ridge, NJ (US)

(72) Inventors: Wu Chou, Basking Ridge, NJ (US); Arn Hyndman, Ottawa (CA); Feng Liu, Hillsborough, NJ (US)

(73) Assignee: Avaya Inc., Basking Ridge ( * ) Notice: Subject to any disclaimer, the term of this patent is extended or adjusted under 35 U.S.C. 154(b) by 0 days.

This patent is subject to a terminal disclaimer.

(21) Appl. No.: 13/763,743

(22) Filed: Feb. 11, 2013

(65) Prior Publication Data
US 2013/0159419 A1    Jun. 20, 2013

Related U.S. Application Data

(63) Continuation of application No. 13/177,178, filed on Jul. 6, 2011, now Pat. No. 8,375,085.

(51) Int. Cl.
*G06F 15/16* (2006.01)

(52) U.S. Cl.
USPC .......................................... 709/204; 709/203

(58) Field of Classification Search
USPC ......... 709/203, 204, 217, 219, 223, 224, 226, 709/228; 715/751; 345/473
See application file for complete search history.

(56) References Cited

U.S. PATENT DOCUMENTS

| | | | |
|---|---|---|---|
| 6,078,948 A | 6/2000 | Podgorny et al. | |
| 7,702,730 B2 | 4/2010 | Spataro et al. | |
| 7,707,249 B2 | 4/2010 | Spataro et al. | |
| 2004/0107254 A1* | 6/2004 | Ludwig et al. | 709/204 |
| 2006/0053196 A1 | 3/2006 | Spataro et al. | |
| 2006/0053380 A1 | 3/2006 | Spataro et al. | |
| 2006/0080432 A1 | 4/2006 | Spataro et al. | |
| 2007/0002057 A1* | 1/2007 | Danzig et al. | 345/473 |
| 2007/0005696 A1* | 1/2007 | Beers et al. | 709/204 |

(Continued)

FOREIGN PATENT DOCUMENTS

| WO | 0165483 A2 | 9/2001 |
|---|---|---|
| WO | 2008088666 A1 | 7/2008 |

OTHER PUBLICATIONS

"GB Patent Application No. GB1122170.2, Great Britain Office Action dated Apr. 20, 2012," Avaya Inc., 8 pages.

(Continued)

*Primary Examiner* — Quang N Nguyen
(74) *Attorney, Agent, or Firm* — Kacvinsky Daisak PLLC; John Maldjian, Esq.; Alexander D. Walter, Esq.

(57) ABSTRACT

Embodiments of the present invention generally relate to a system and method enhanced collaboration through teleportation. In one or more embodiments, there is provided a system for moderating an enhanced collaboration environment for at least a set of participants, comprising a server for facilitating a 2-D federated collaboration environment for the at least one set of participants; a server for facilitating a 3-D virtual collaboration environment for the at least one set of participants; and a gateway server for facilitating teleportation of at least two participants of the at least one set of participants from the 2-D federated collaboration environment to form a teleported collaboration group in the 3-D virtual collaboration environment.

5 Claims, 6 Drawing Sheets

(56) References Cited

U.S. PATENT DOCUMENTS

| | | | |
|---|---|---|---|
| 2007/0050448 A1* | 3/2007 | Gonen et al. | 709/204 |
| 2009/0249226 A1 | 10/2009 | Manolescu et al. | |
| 2010/0192072 A1 | 7/2010 | Spataro et al. | |
| 2010/0223320 A1* | 9/2010 | Huang et al. | 709/203 |
| 2010/0299618 A1 | 11/2010 | Pare | |
| 2010/0332998 A1 | 12/2010 | Sun et al. | |
| 2011/0087732 A1 | 4/2011 | Lakshmanan et al. | |
| 2011/0238759 A1 | 9/2011 | Spataro et al. | |
| 2011/0252093 A1 | 10/2011 | Spataro et al. | |
| 2012/0158849 A1* | 6/2012 | Yoakum et al. | 709/205 |
| 2012/0265810 A1* | 10/2012 | Reid et al. | 709/204 |
| 2012/0284638 A1* | 11/2012 | Cutler et al. | 715/751 |

OTHER PUBLICATIONS

Morrison, "A Second Chance for Second Life," Wall Street Journal, Aug. 19, 2009, p. A27, retrieved at http://www-03.ibm.com/ibm/academy/meeting/wsLarticle_08192009.shtml, date of retrieval Jul. 1, 2011, 2 pages.

Lamonica, "IBM Breaks Ground in Second Life," Oct. 19, 2006, retrieved at http://news.cnet.com/8301-10784_3-6127448-7.html, date of retrieval Jul. 1, 2011, 4 pages.

Avaya Inc., Japanese Application No. 2012-023691, Office Action dated Jun. 17, 2013, 2 pages.

* cited by examiner

SYSTEM AND METHOD OF ENHANCED COLLABORATION THROUGH TELEPORTATION

CROSS-REFERENCE TO RELATED APPLICATIONS

This application is a continuation patent application of U.S. patent application Ser. No. 13/177,178, filed Jul. 6, 2011, entitled "SYSTEM AND METHOD OF ENHANCED COLLABORATION THROUGH TELEPORTATION," the content of which is hereby incorporated by reference in its entirety.

BACKGROUND

1. Field of the Invention

Embodiments of the present disclosure generally relate to a system and method of collaboration. More specifically, embodiments of the present disclosure relate to a system and method of enhancing collaboration experiences by relatively seamlessly teleporting between federation (2-D) collaboration environments and virtual 3-D collaboration environments.

2. Description of the Related Art

Collaboration is a major form of communication, where two or more individuals or groups work together in an intersection of common goals by sharing knowledge, information, learning, and building consensus. As the world becomes more connected with global computer networks such as the internet, wire and wireless networking, and the like, collaboration between and among individuals and groups, crossing disparate geographical locations, has become the norm to effectively accomplish complex and sophisticated tasks.

A common approach to enable collaboration between and among individuals and/or groups is through a "2-D" or "federation" collaboration environments, e.g., Google Wave or Google Shared Spaces in Google Labs, in which a joint collaboration environment may be created by connecting each group together according to a federation protocol, e.g., XMPP Inter-Domain Federation Protocol, as described in XEP-0238 and used in the Google Wave Federation protocol. The 2-D collaboration can be, by way of example only, a live, shared space on a global computer network, such as the internet, where individuals and groups may discuss and work together using and exchanging formatted text, instant messaging, photos, videos, maps, and more.

The federated collaboration environment may include equal parts of conversation and exchange of documents, including group chat, contact and document sharing. Any participant may reply anywhere in the message, edit the content, and add participants at any point in the process. There may also be a history feature in this 2-D environment that allows a participant to preserve who said what and when, for instance. With live transmission as a user types on his/her keyboard, participants can have relatively fast conversations, see edits and interact with extensions in real-time.

In collaboration through federation, however, each group retains its own individual identity, governing body, physical environment, and management infrastructure. And each group collaborates under a joint commitment to work together on a common task, and use the federation protocol to share media and information crossing all groups and participants.

Although this type of collaboration environment using a federation protocol is a common approach for collaboration between and among groups, this collaboration paradigm has some fundamental limitations. For example, the collaboration capabilities in federations are constrained by the capabilities of each individual and/or group by the physical environment each is in, and by the discrepancy in the management infrastructure used by each.

Consequently, the flexibility and robustness (i.e., "richness") of the federated collaboration environment is upper bounded by the common denominator (not the union) of the capabilities in each group, which is convoluted with various factors, e.g., media, physical environment, registration, resources, and the like. This limitation is fundamental in collaboration through federation, no matter whether it is in 2-D or 3-D environment. This makes truly rich, dynamic and enhanced collaboration difficult to achieve through federation, and it is not truly extensible as federation can put further constraints in collaboration when new groups are added or software modules need to be downloaded to facilitate a collaboration session in federation. Prior known solutions are limited by the physical limitations or common denominator features of each individual or group in collaboration.

Rich, 3D-type collaboration environments are also known, such as, for example only, the web.alive product, available from Avaya, Inc. (See web.alive, Ver. 2.5). In such environments, the collaboration experience is enhanced. However, certain of the limitations discussed with respect to the 2-D environment exist in this 3-D environment as well. Significantly, heretofore, there are no known systems or methods for transitioning or teleporting virtually seamlessly between 2-D federation collaboration environments and 3-D, "web.alive-like" collaboration environments, such that a participant or group can experience an enhanced collaboration experience with virtually seamless transitions to and from each type of collaboration environment.

Thus, there is a need for a system and method that does not necessarily depend on, or is limited by, the physical environment of each individual and/or group in collaboration in a federation-type, 2-D environment, but may enable rich collaboration in a coordinated and substantially instantaneous manner between a 2-D federation environment to a virtual 3-D environment, while overcoming the common denominator constraint in the paradigm of collaboration through federation.

SUMMARY

In one embodiment, there is provided a method for moderating the teleportation of a federated collaboration session to a 3-D virtual collaboration session, comprising launching teleportation services in the federation server; selecting participants and meeting location for teleportation; notifying the federation server of the selections of participants and meeting location; instructing the federation server to launch gateway instances to every participant; and instructing the 3-D server to take participants to meeting location and begin the collaboration in the 3-D virtual collaboration environment.

In another embodiment, there is provided a system for moderating an enhanced collaboration environment for at least a set of participants from a group, comprising a federated server for facilitating a 2-D federated collaboration environment for the at least one set of participants; a 3-D server for facilitating a 3-D virtual collaboration environment for the at least one set of participants; and a gateway server for facilitating teleportation of at least two participants of the at least one set of participants from the 2-D federated collaboration environment to form a teleported collaboration group in the 3-D virtual collaboration environment.

In yet another embodiment, there is provided a tangible computer-readable storage medium comprising program instructions, wherein the program instructions are computer executable to launch teleportation services in the federation server; instruct the federation server to load gateway instance in a moderator client; select participants and meeting location for teleportation; notify the federation server of the selections of participants and meeting location; instruct the federation server to launch gateway instances to every participant; scan the participants for characteristic information; instruct the 3-D server to start and to load characteristic information; and instruct the 3-D server to take participants to meeting location and begin the collaboration in the 3-D virtual collaboration environment.

BRIEF DESCRIPTION OF THE DRAWING

So the manner in which the above recited features of the present disclosure can be understood in detail, a more particular description of embodiments of the present disclosure, briefly summarized above, may be had by reference to embodiments, which are illustrated in the appended drawings. It is to be noted, however, the appended drawings illustrate only typical embodiments of embodiments encompassed within the scope of the present disclosure, and, therefore, are not to be considered limiting, for the present disclosure may admit to other equally effective embodiments, wherein.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures.

DETAILED DESCRIPTION

One or more embodiments of the present disclosure comprise a system and method of collaboration via teleportation from a 2-D federation collaboration environment to a virtual 3-D environment to substantially alleviate and overcome fundamental limitations and constraints if a group of participants were to remain solely in collaboration via federation, where such collaboration is limited to the physical environment of each group in the collaboration.

"Teleportation" may be described, in the context of embodiments of the present disclosure, as the transfer of information, data or documents from one point or collaboration environment to another, substantially instantaneously and relatively seamlessly.

Figure 1:
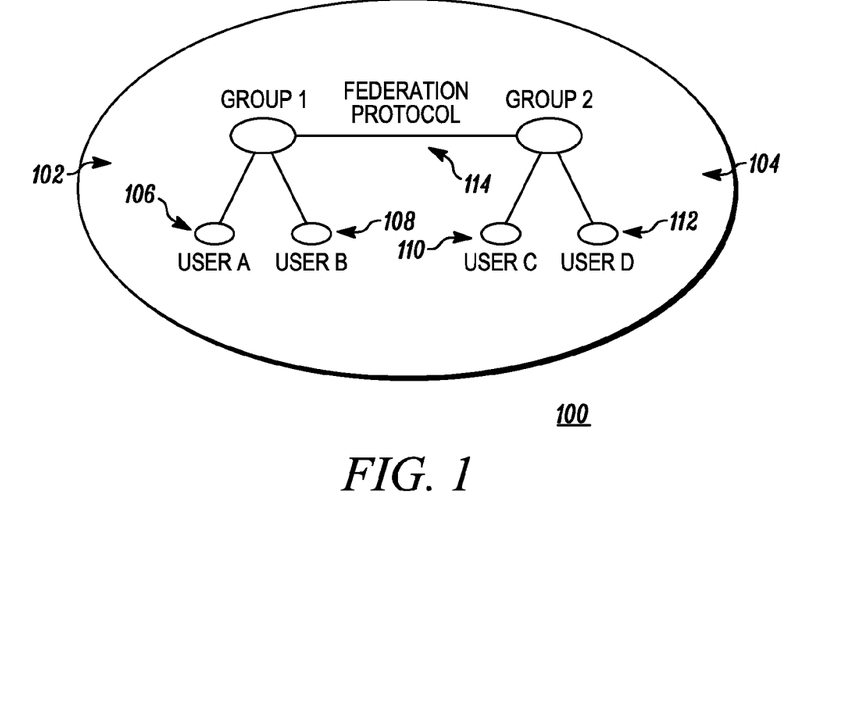
FIG. 1 is a block diagram depicting a federated collaboration environment between and among users in groups in accordance with one or more embodiments of the present disclosure.

FIG. 1 is a block diagram depicting an example of a known system of collaboration through federation using a federation protocol, including groups and participants within such groups, wherein each participant may herein be referred to as a "user." The collaboration environment 100 may comprise at least a Group 1 (102) and a Group 2 (104). Group 1 may comprise at least a User A (106) and a User B (108). Group 2 (104) may comprise at least a User C (110) and a User D (112). Groups 1 and 2 (102, 104), within the collaboration environment 100, may be connected and communicate via a federation protocol 114 to each other and possibly to other groups or participants (not shown).

The collaboration environment 100 may include or be in communication with additional groups and additional users within each group. However, only the groups and users depicted and described are shown in FIG. 1 for clarity purposes.

The collaboration environment 100 may include equal parts of conversation and exchange of documents, including group chat, contact and document sharing. Any participant may reply anywhere in the message, edit the content, and add participants at any point in the process. There may also be a history feature in this 2-D environment that allows a participant to preserve who said what and when, for instance. With live transmission as a user types on his/her keyboard, participants can have relatively fast conversations, see edits and interact with extensions in real-time.

In collaboration through federation, each Group 1 and 2 (102,104) retains its own individual identity, governing body, physical environment, and management infrastructure. Each Group 1 and 2, for example, collaborate under a joint commitment to work together on a common task, and use the federation protocol 114 to share media and information crossing all groups, e.g., Groups 1 and 2 (102, 104) and participants, e.g., Users A through D (106, 108, 110 and 112).

Figure 2:
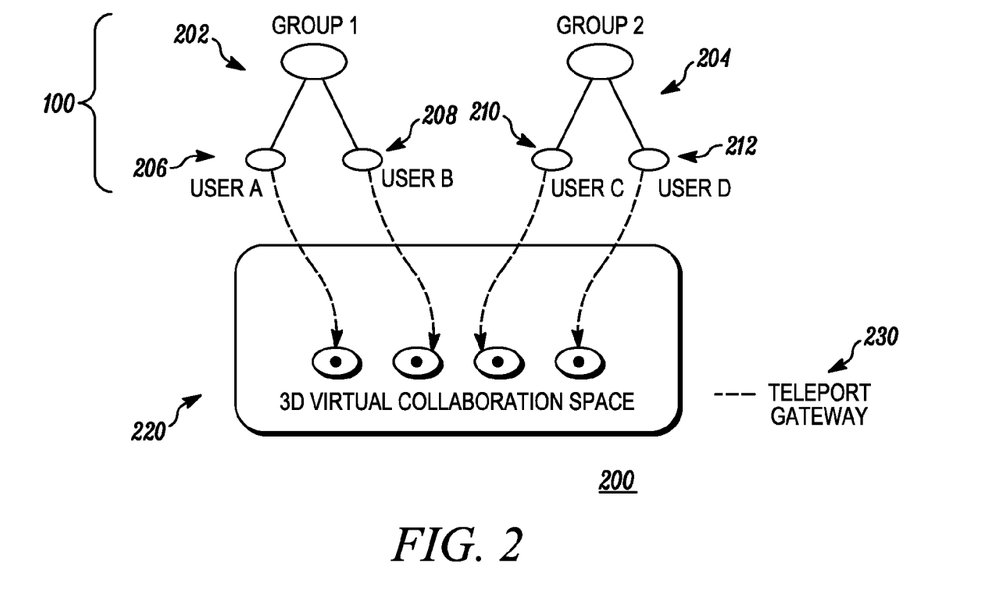
FIG. 2 is a block diagram depicting a 3-D virtual collaboration between and among groups in accordance with one or more embodiments of the present disclosure.

FIG. 2 is a block diagram depicting a collaboration environment 200 using teleportation in accordance with one or more embodiments of the present disclosure. The collaboration environment 200 comprises Groups 1 and 2 (202, 204), which further comprise Users A and B (206, 208) and Users C and D (210 and 212), respectively. These groups (202, 204) and users (206, 208, 210 and 212) are similar to those groups and users described in connection with FIG. 1. However, in this configuration of FIG. 2, two or more of the users, which may or may not be in a federation collaboration at any previous moment, have available to them a 3-D virtual collaboration space 220, in which the two or more users within the groups of FIG. 2 can teleport via a teleportation gateway 230, into the 3-D world 220 with augmented 3-D virtual reality. An example of such 3-D virtual collaboration environment is available through Avaya's web.alive (Ver. 2.5) software. The Avaya web.alive service may consist of multiple meeting rooms, auditoriums, tables, projection screens, lobby areas, and the like.

FIG. 2 depicts an example of a rich collaboration paradigm based on "teleportation", in which rich collaboration can be enabled, by way of example only, through moving each individual group from its physical world 100 to a precise location in a virtual collaboration world 220, created to harbor and enable the rich collaboration almost instantaneously. This virtual collaboration environment 220, to where each group or participants within groups is/are teleported, is equipped with rich collaboration capabilities and resources to effectively achieve the common goals set forth in the intended collaboration from the federation 2-D environment where collaboration is based on the capabilities that are common to all participants in their own local environments.

In addition to teleporting participants into the 3-D collaboration environment, one or more embodiments of the present disclosure are capable of scanning the participants just prior to or at the time of teleportation and then teleporting all related information from the federation environment 100 to the 3-D environment 220 for the collaboration at substantially the same time. In particular, the related context (participant information, collaboration topic, etc.) and content (interaction records, documents, etc.) from each participant are obtained from scanning and teleported from the physical world 100 to the collaboration environment in the 3-D virtual world 220. When the participants have completed their collaboration in the virtual 3-D world 220, the context and content can be brought back to the original federated collaboration environment 100 of each participant and group.

As disclosed, rich collaboration can be enabled substantially instantaneously by teleporting each individual group from its own physical environment into a rich collaboration environment/location in (3-D) virtual world or an augmented reality (3-D) virtual world. The rich collaboration environment 220 would be the common collaboration space where all collaborators can work together in the virtual world. This is done in such a way that all groups are teleported to a particular, predetermined collaboration location in the virtual world, where such location is or will be equipped with rich collaboration resources and capabilities, along with the related information obtained from scanning at the time of teleportation, e.g. context, history, etc. for collaboration.

Each participant in the 3-D collaboration environment may be represented by a human avatar (not shown), which can walk, talk, touch, make gestures, grab somebody for a private talk, walk to a private room, form an ad hoc collaboration group with surrounding participants (human avatars), and the like. The virtual collaboration space 220 in this embodiment may be equipped with multiple display screens, projectors, white boards, tables, pointers, doors, and the like (not shown). The human avatars are placed spatially in the virtual collaboration environment. They can see and interact with each other, can find and locate each other as in the physical world, can hear and talk to each other in 3-D rendered audio, for example.

An avatar's voice is the real voice of the human whom the avatar represents, but it can be synthesized and rendered with the human avatar's position in virtual 3-D environment. The voice in the 3-D virtual collaboration environment can have 3-D (left, right, above, down, and the like) direction and spatial separation according to the spatial position and acoustics of the virtual room environment. This feature is very helpful to improve user experience, to enhance collaboration, and to effectively alleviate the problem of cross-talking and multi-talking in rich collaboration environments.

Figure 3A:
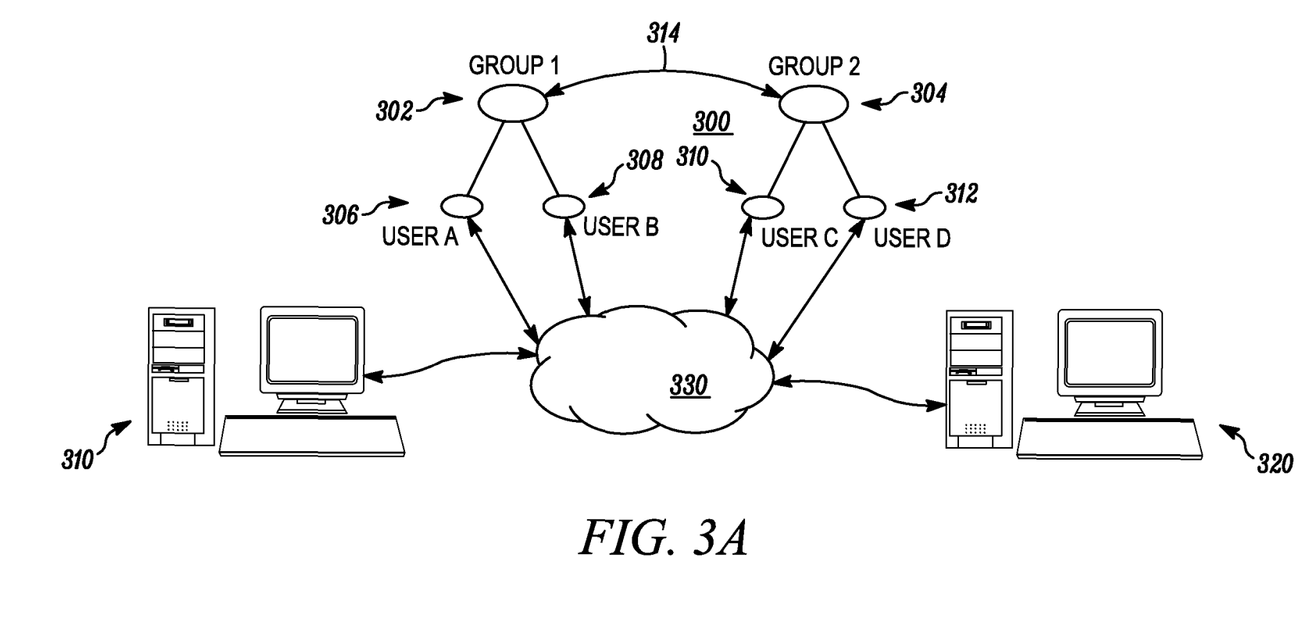
FIG. 3A depicts an exemplary computer network system of collaboration in accordance with one or more embodiments of the present disclosure.

FIG. 3A depicts a collaboration system in accordance with one or more embodiments of the present disclosure. A basic system 300 comprises at least a federation server 310, a 3-D server 320, and a transmission or interface network system 330 over which to transmit data to and from the federation server 310 and the 3-D server 320 as well as to and from the participants or users, e.g., Users 306 . . . 312 of Group 1 and 2 (302, 304). The network system 330 may be a partial or full deployment of most any communication or computer network or link, including any of, any multiple of, any combination of or any combination of multiples of an electronic circuit trace, transmission system electronic or optical physical medium, public or private, terrestrial wireless or satellite system, and wireline networks or links.

The network 330 may include, for example, a gateway engine 315 (see FIG. 3B) for facilitating teleportation, network elements from a Public Switch Telephone Network (PSTN), the Internet, core and proprietary public networks, wireless voice and packet-data networks, such as 1G, 2G, 2.5G, 3G and 4G telecommunication networks, wireless office telephone systems (WOTS) and/or wireless local area networks (WLANs), including, Bluetooth and/or IEEE 802.11 WLANs, wireless personal area networks (WPANs), wireless metropolitan area networks (WMANs) or the like; and/or communication links, such as Universal Serial Bus ("USB") links; parallel port links, Firewire links, RS-232 links, RS-485 links, Controller-Area Network ("CAN") links, or the like.

The network elements and/or communication links may include circuit-switched, as well as, packet-data elements to provide teleportation of content, triggers and/or other information; and may be configured to communicate such information using any number of protocols and in any manner consistent with exchanging such information between and among federation server 310 and 3-D server 320. These protocols may include standardized, proprietary, open-source, and freely-available communication protocols for communicating content in circuit-switching and/or packet data networks, or the like.

Figure 4:
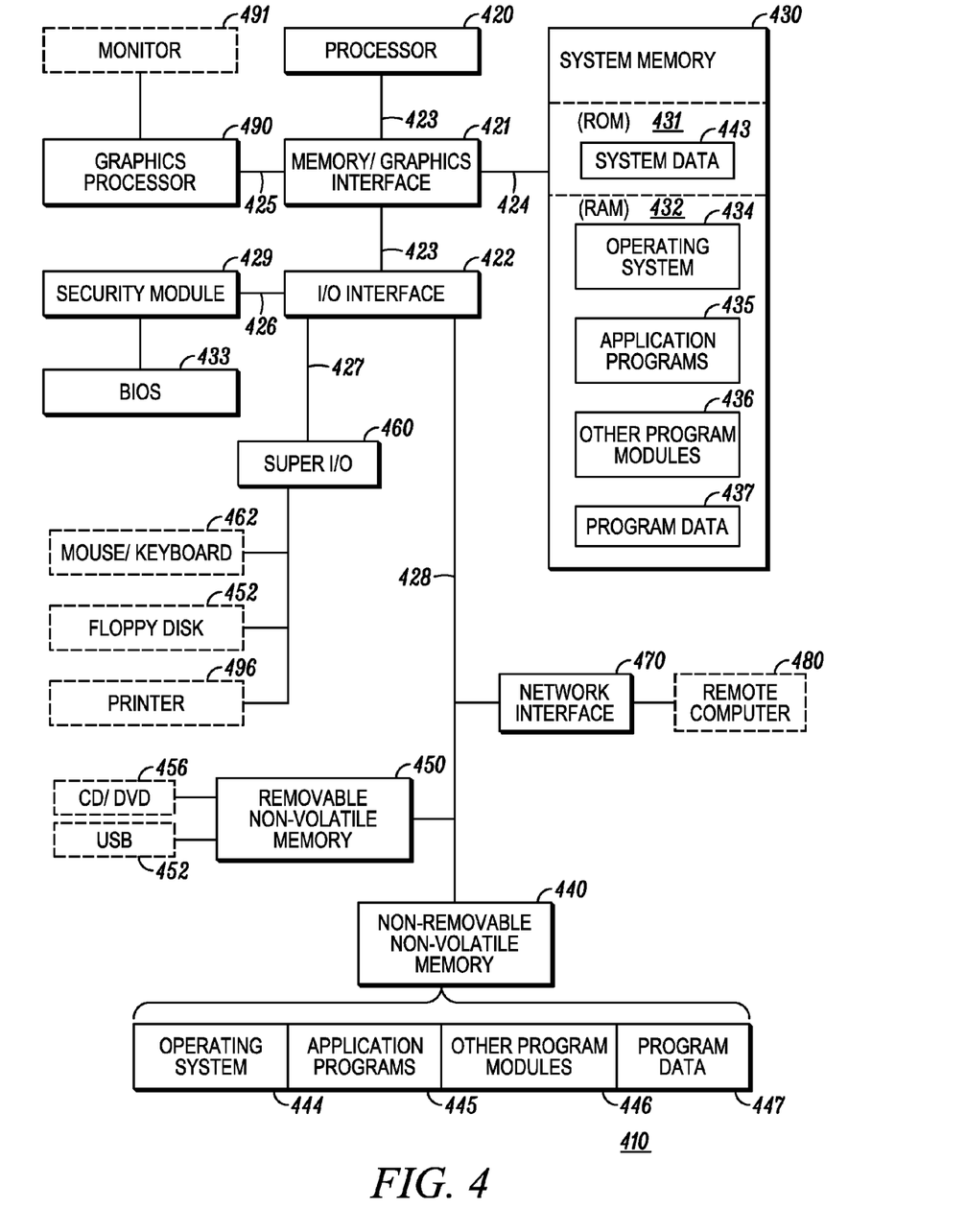
FIG. 4 depicts a computer system in accordance with one or more embodiments of the present disclosure.

The federated server 310 and 3-D server 320 may respectively comprise any communication devices suitable for communicating with embodiments of the present disclosure. In one or more embodiments, at least one of the federated server 310, gateway engine 315 or 3-D server 320 may comprise at least a machine or computer system, for example, as shown in FIG. 4 for implementing one or more embodiments of the present disclosure. It is contemplated within the embodiments of the present disclosure that any embodiment of the present disclosure may be implemented via the federation server 310, the 3-D server 320, the network 330, the gateway engine 315 or the like.

Figure 3B:
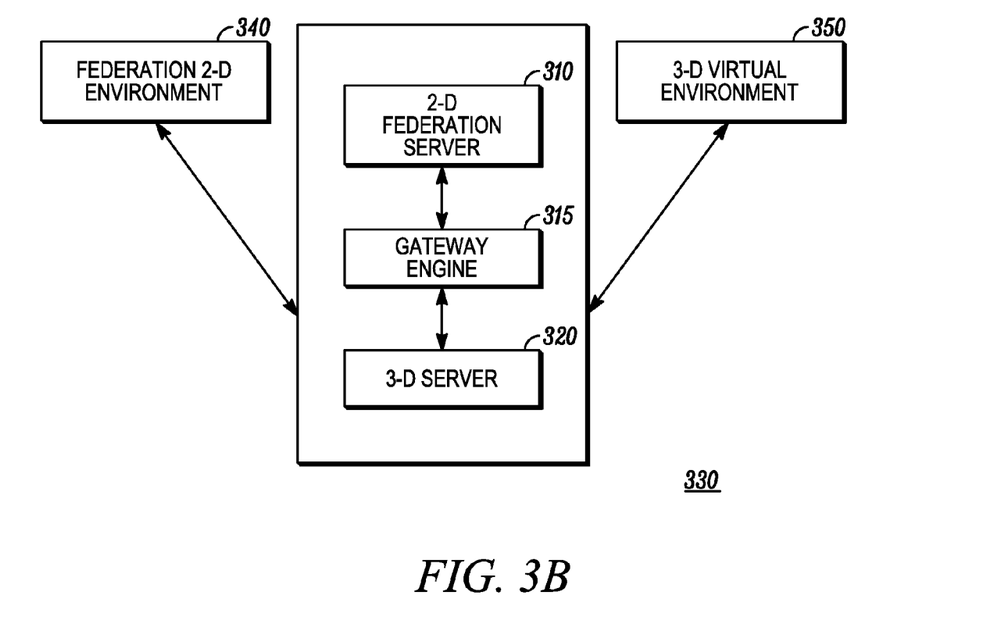
FIG. 3B depicts a system block diagram of the teleporting interface 330 of FIG. 3A in accordance with one or more embodiments of the present disclosure.

Although, in FIG. 3A, federation server 310 and 3-D server 320 are shown outside of, and in communication with, the network 330, it is contemplated by embodiments of the present disclosure to alternatively include the federation server 310 and 3-D server 320 in and as part of the network 330, as exemplified in FIG. 3B.

Referring now to FIG. 3B, a block diagram illustrates the interfacing of the federation server 320 with the 3-D server 320 via teleportation, which is facilitated by the gateway engine (or server) 315. FIG. 3B also depicts federation collaboration environment 340 and 3-D collaboration environment 350, both of which are capable of hosting participants in order to establish an enhanced or rich collaboration environment. The exchange of documents and other data from the 2-D federation environment is accomplished by way of the interaction between and among the federation server 310, 3-D server 320 and the gateway server 315, all within the network system 330.

Referring to now to FIG. 4, a block diagram illustrating exemplary architecture of any one or more of the federation server 310, the 3-D server 320 or the gateway engine 315. Any one or combination of one or more engines or servers could serve as the host server 410 to accomplish the method contemplated by embodiments of the present disclosure. As understood by embodiments of the present disclosure, components shown in dashed outline may be optional.

Components may include a processor 420, a system memory 430, a memory/graphics interface 421, also known as a Northbridge chip, and an I/O interface 422, also known as a Southbridge chip. The system memory 430 and a graphics processor 490 may be coupled to the memory/graphics interface 421. A monitor 491 or other graphic output device may be coupled to the graphics processor 490.

A series of system busses may couple various system components including a high speed system bus 423 between the processor 420, the memory/graphics interface 421 and the I/O interface 422, a front-side bus 424 between the memory/graphics interface 421 and the system memory 430, and an advanced graphics processing (AGP) bus 425 between the memory/graphics interface 421 and the graphics processor 490.

The system bus 423 may be any of several types of bus structures including, by way of example, and not limitation, such architectures include Industry Standard Architecture (ISA) bus, Micro Channel Architecture (MCA) bus and Enhanced ISA (EISA) bus. As system architectures evolve, other bus architectures and chip sets may be used but often generally follow this pattern. For example, companies such as Intel and AMD support the Intel Hub Architecture (IHA) and the Hypertransport architecture, respectively.

The host server 410 typically includes a variety of computer readable media. Computer readable media can be any available media that can be accessed by host server 410 and includes both volatile and nonvolatile media, removable and non-removable media. By way of example, and not limitation, computer readable media may include computer readable storage media and communication media. Computer storage media include volatile and nonvolatile, removable and non-removable media implemented in any method or technology for storage of information such as computer readable instructions, data structures, program modules or other data.

Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and can accessed by the host server 410. Communication media typically embodies computer readable instructions, data structures, program modules or other data in a modulated data signal such as a carrier wave or other transport mechanism and includes any information delivery media.

The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable storage media.

The system memory 430 may include computer readable storage media in the form of volatile and/or nonvolatile memory such as read only memory (ROM) 431 and random access memory (RAM) 432. The system ROM 431 may include permanent system data 443, such as gateway protocol information for facilitating the teleportation of participants and their respective documents and things from one collaboration environment to another. In accordance with some embodiments of the present disclosure, a basic input/output system (BIOS) may also be stored in system ROM 431. RAM 432 typically contains data and/or program modules that are immediately accessible to and/or presently being operated on by processor 420.

By way of example, and not limitation, the host server 410 may include operating system 434; application programs 435; other program modules 436, such as those needed to create the virtual 3-D environment; and program data 437. It is contemplated within embodiments of the present disclosure that any embodiment of the present disclosure may be implemented via an application program 435 or other program modules 437 and may utilize program data 437.

The I/O interface 422 may couple the system bus 423 with a number of other buses 426, 427 and 428 that couple a variety of internal and external devices to the host server 410. A serial peripheral interface (SPI) bus 426 may connect to a BIOS memory 433 containing the basic routines that help to transfer information between elements within host server 410, such as during start-up. In accordance with some embodiments of the present disclosure, a security module 429 may be incorporated to manage teleportation functions.

A super input/output chip 460 may be used to connect to a number of 'legacy' peripherals, such as floppy disk 452, keyboard/mouse 462, and printer 496, as examples. The super I/O chip 460 may be connected to the I/O interface 422 with a low pin count (LPC) bus, in accordance with some embodiments. The super I/O chip 460 is widely available in the commercial marketplace.

In one of many embodiments, bus 428 may be a Peripheral Component Interconnect (PCI) bus, or a variation thereof, may be used to connect higher speed peripherals to the I/O interface 422. A PCI bus may also be known as a Mezzanine bus. Variations of the PCI bus include the Peripheral Component Interconnect-Express (PCI-E) and the Peripheral Component Interconnect-Extended (PCI-X) busses, the former having a serial interface and the latter being a backward compatible parallel interface. In other embodiments, bus 428 may be an advanced technology attachment (ATA) bus, in the form of a serial ATA bus (SATA) or parallel ATA (PATA).

The host server 410 may also include other removable/non-removable, volatile/nonvolatile computer storage media. By way of example only, the host server may include memory 440 that may read from or writes to non-removable, nonvolatile magnetic media or, alternatively, may read from or write to removable and/or volatile media. Removable media, such as a universal serial bus (USB) memory 452 or CD/DVD drive 456 may be connected to the PCI bus 428 directly or through an interface 450. Other removable/non-removable, volatile/nonvolatile computer readable storage media that can be used in the exemplary operating environment include, but are not limited to, magnetic tape cassettes, flash memory cards, digital versatile disks, digital video tape, solid state RAM, solid state ROM, or the like.

The drives and their associated computer storage media, discussed above and illustrated in FIG. 4, provide storage of computer readable instructions, data structures, program modules and other data for the host server 410, including, for example, the central repository 412, and the central-repository records 4141-n. These storage media may be used to store the features of the 3-D collaboration environment, participant information or participant documents and things used in a past, present or future collaboration session.

Hard disk drive 440 is illustrated as storing operating system 444, application programs 445, other program modules 446, and program data 447. Note that these components can either be the same as or different from operating system 434, application programs 435, other program modules 436, and program data 437. Operating system 444, application programs 445, other program modules 446, and program data 447 are given different numbers here to illustrate that, at a minimum, they are different elements within the host server 410.

An operator or moderator may enter commands and information into the host server 410 through input devices such as a mouse/keyboard 462 or other input device combination. Other input devices (not shown) may include a microphone, joystick, game pad, satellite dish, scanner, or the like. These and other input devices are often connected to the processor 420 through one of the I/O interface busses, such as the SPI 426, the LPC 427, or the PCI 428, but other busses may be used. In accordance with some embodiments, other devices may be coupled to parallel ports, infrared interfaces, game ports, or the like (not depicted), via the super I/O chip 460.

The host server 410 may operate in a networked environment using logical connections to one or more remote computers, such as a remote computer 480 via a network interface controller (NIC) 470. The remote computer 480 may be a personal computer, a server, a router, a network PC, a peer device or other common network node, and typically includes many or all of the elements described above relative to the host server 410.

The logical connection between the NIC 470 and the remote computer 480 depicted in FIG. 4 may include a local area network (LAN), an Ethernet-based network, a wide area network (WAN), or both, but may also include other networks. Such networking environments are commonplace in offices, enterprise-wide computer networks, contact centers, intranets, and the Internet.

It is appreciated by embodiments of the present disclosure, in FIG. 4, that both federation server 310 and 3-D server 320, may utilize certain of the features of the host server 410, whereas many of such features or elements are incorporated in most communication devices presently in existence.

Figure 5:
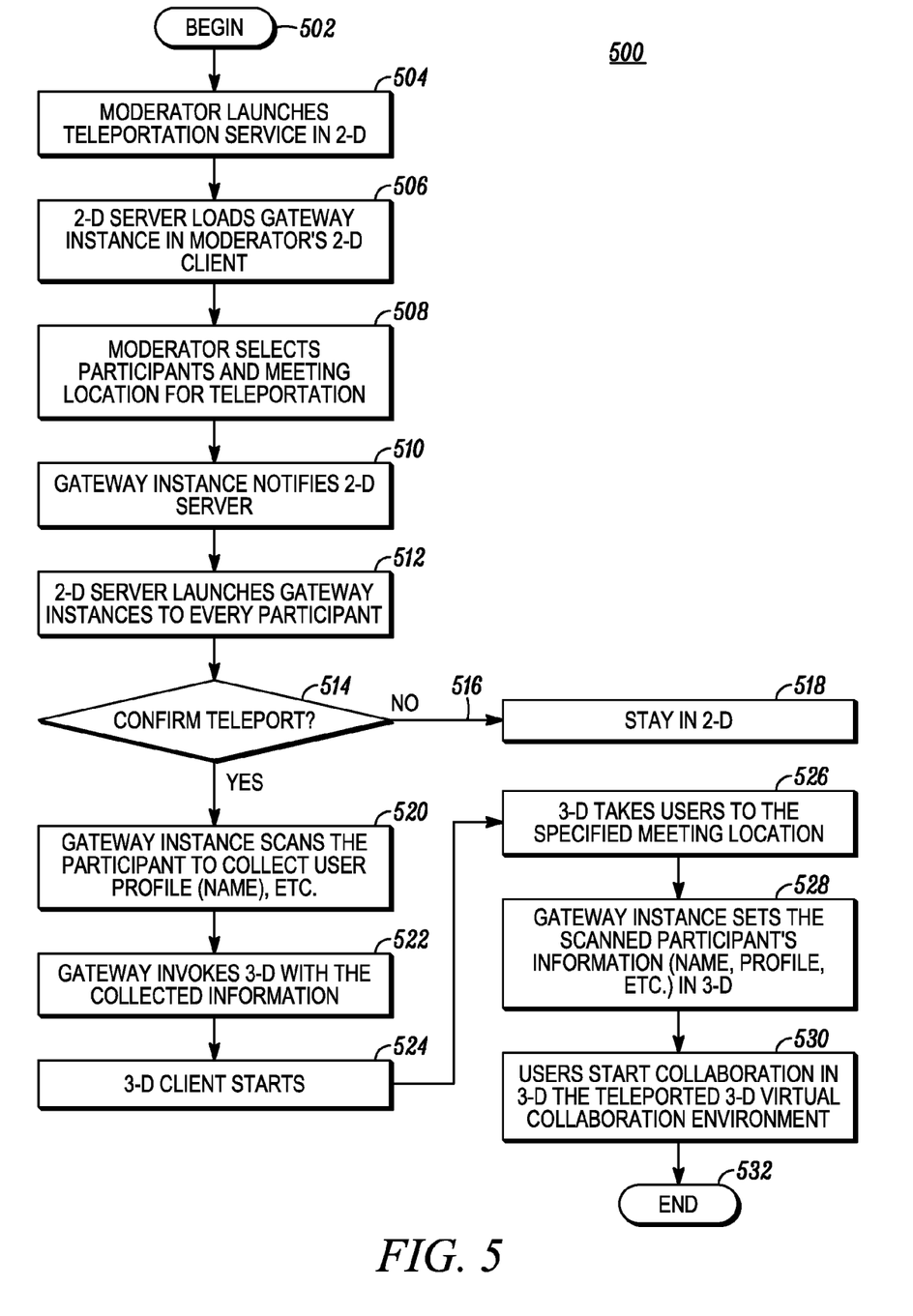
FIG. 5 depicts a flow chart describing a method in accordance with one or more embodiments of the present disclosure.

FIG. 5 is a flow diagram illustrating an example flow 500 of one or more methods in accordance with embodiments of the present disclosure. The flow 500 may begin at step 502 with the initiation of a collaboration session between and among groups or individual participants or both. Likely but not necessarily the collaboration session will begin in a federated collaboration environment. At some point during the session, there may be a need for enhanced, rich 3-D collaboration. As a result, at step 504, a moderator will initiate or launch a teleportation service in the federation collaboration session, shown in shorthand as a 2-D session. This launch may be achieved utilizing the computer system described in connection with FIGS. 3A, 3B and 4 herein.

At step 506, the 2-D server 310 may load integration and protocol converter software programs (e.g., Gateway Instance) from the application programs 445 of FIG. 4 into the moderator's 2-D client to be able to moderate a transportation of participants from the 2-D collaboration environment to the 3-D collaboration environment. At step 508, the moderator may select participants and meeting location in preparation for the teleportation to the 3-D collaboration environment. The gateway server, at step 510, will notify the federation server of the participants whom wish to teleport to the 3-D environment. At step 512, the federation or 2-D server, as a result, launches gateway instances to every participant desiring to teleport and requests whether the participants agree to be teleported. A decision is made by the participants at step 514 as to whether they want to teleport or not. If not, the participant remains in the 2-D environment at step 516 and the teleportation service ends at step 518.

Alternatively, for the participants that confirm teleportation services, at step 520, the gateway instance scans the participants to collect individual characteristic information such as user profile information, name, and other related context and content information and adds them to the gateway instance. At step 522, the gateway server invokes the virtual 3-D environment with the collected information of the scanning of the participants so that when the participants arrive, their avatars and other virtual 3-D experiences have been created in the virtual space.

At step 524, the 3-D client begins to operate. In the participant's web browser, at step 526, the system teleports the participants to the specific spatial position of the meeting room or meeting place in the 3-D virtual environment along with the scanned participant information.

At step 528, the gateway instance maps the participants as a virtual figure, e.g., human avatar, with names, etc., from the collected profile information, contact information, etc., and the virtual figure is teleported to the precise location in the virtual 3-D collaboration environment to complete the teleportation.

At step 530, collaboration by all the participants can now continue in the 3-D collaboration environment. When the participants have agreed to end their session, the method ends at step 532 and the participants either end their session completely or return to the federation, 2-D collaboration environment to continue collaborations. Alternatively, if the participants return to the 2-D federation collaboration environment, the gateway instance may return the context and content information to the 2-D environment.

Figure 6:
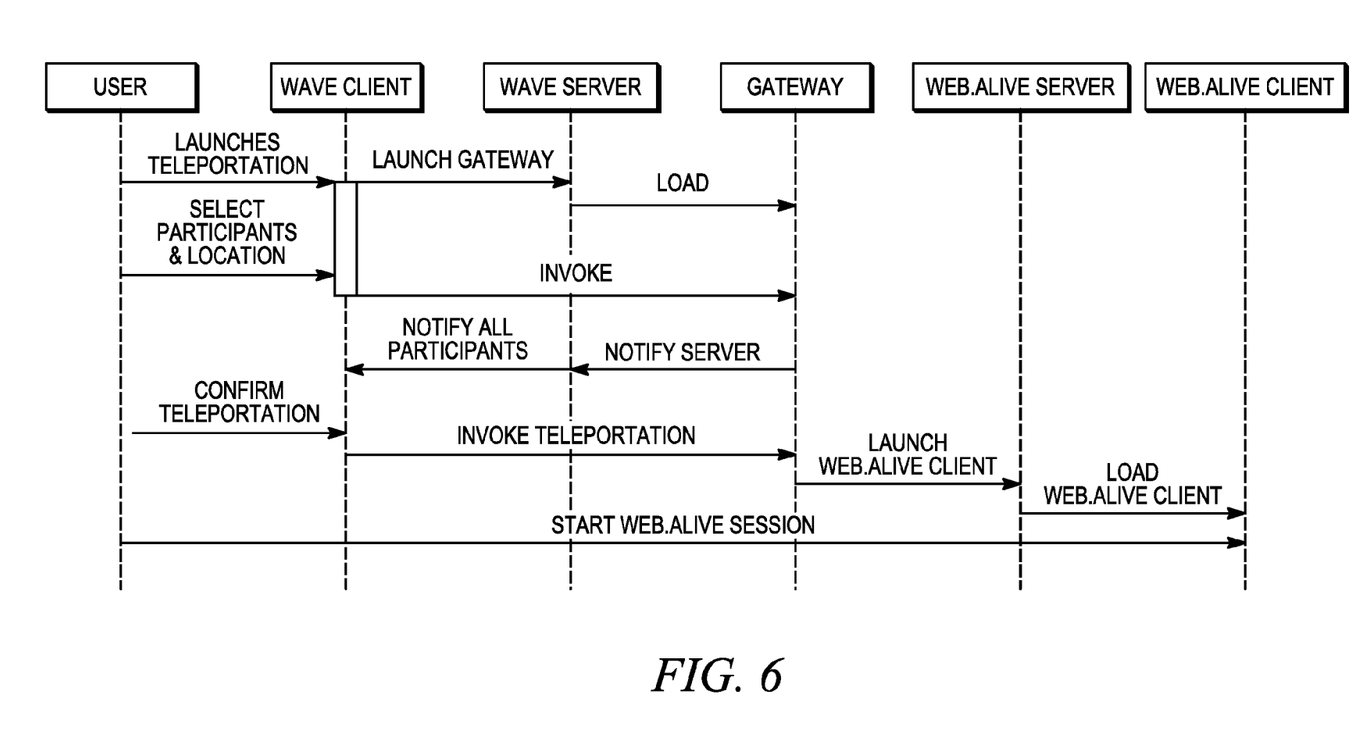
FIG. 6 depicts a sequence diagram in accordance with an embodiment of the present disclosure.

In operation, referring to the teleportation sequence diagram of FIG. 6, using XMPP federation collaboration, e.g. Google Wave, as a specific example, at the start, each participant can be on a Google Wave session (which can be either in one group or in many groups connected through federation), but with difficulty to collaborate effectively as they are limited by the common features in Google Wave. As a result, the moderator launches teleportation in Google Wave. The Google Wave server loads Gateway Instance of the target collaboration space into the moderator's client. The moderator selects the participants to form a collaboration group, and selects the meeting location (e.g., a particular meeting room, meeting area, etc.) in 3-D collaboration space to teleport these participants to. Then, the moderator's Google Wave notifies the Google Wave server with the Gateway Instance. Next, the Google Wave server launches Gateway Instances to the selected participants (using gadget and robot in this particular embodiment), asking them if they agree to be teleported. If the participant agrees to be teleported, the Gateway scans the participant and collects user profile (name, etc.) and other related context and content information, and adds them to the Gateway Instance. The gateway server invokes the virtual environment (e.g. Avaya's web.alive service) with the collected information obtained from the scanning.

The web.alive client for the participant starts, and in the participant's web browser, it teleports the participant to the specific spatial position of the meeting room or meeting place in the said 3-D virtual environment along with the scanned participant information. The participant is then mapped as a virtual figure (human avatar), with names, etc. from the collected profile, contact information, etc., and this virtual figure is teleported to the precise location in the virtual collaboration environment to complete the teleportation.

Collaboration starts as all participants are teleported to the precise collaboration location in the web.alive 3-D virtual collaboration environment, and they can hear, see, talk, touch, and interact with each other instantaneously.

Certain advantages are gained through this flow and the systems discussed above with respect to one or more embodiments of the present disclosure. For example, there is no need for the selected participants to install software or modify their individual group environment, as long as the participant joins the 2-D, or specifically Google Wave, with a web browser. Additionally, the collaboration in the teleported space is not limited by the limitation of the physical environment of each individual group, e.g. rooms, projection screens, etc., as further collaborations will be conducted at the teleported 3-D virtual collaboration environment, and it can utilize multiple rooms, private collaboration spaces, projection screens, white boards, video screens, spatial separations, proximity based ad hoc collaboration groups, etc. simultaneously, instantaneously, and on demand to enable effective and rich collaboration. Furthermore, in the above-described flow and systems, the rich collaboration environment, which participants are teleported to, maintains a connection to the original environment of each individual group (e.g., individual Google Wave session), and it can transmit related information between them.

However, unlike collaboration via federation, all participants are under the management of the moderator in the virtual collaboration environment to which they are teleported, while they are enabled by the rich collaboration capabilities in the virtual environment that is not limited by the common denominator of each individual group.

New media, additional display surface, different collaboration rooms, etc. can be added and used on-demand. New ad hoc collaboration groups can be formed in multiple ways by interest and expertise. They can be placed precisely in a selected collaboration area, e.g. private meeting rooms, etc. in the said 3-D collaboration environment. Moreover, the collaboration environment supports proximity based collaboration, in which collaboration groups can be formed based on the spatial proximities (or virtual distances between human avatars) in the 3-D collaboration environment. Moreover, in the collaboration environment, participants can move around to join other collaboration groups or move to a different collaboration environment, e.g. private room, other lobby, etc. with rich collaboration capabilities of 3-D audio, gestures, projection screen, white board, video, etc. along with the collaboration content and context that are attached to each human avatar.

No element, act, or instruction used in the description of the present application should be construed as critical or essential to the present disclosure unless explicitly described as such. Also, as used herein, the article "a" is intended to include one or more items. Where only one item is intended, the term "one" or similar language is used. Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Further, as used herein, the term "set" is intended to include any number of items, including zero. Further, as used herein, the term "number" is intended to include any number, including zero.

Moreover, the claims should not be read as limited to the described order or elements unless stated to that effect. In addition, use of the term "means" in any claim is intended to invoke 35 U.S.C. §112, ¶6, and any claim without the word "means" is not so intended.

While the foregoing is directed to embodiments of the present disclosure, other and further embodiments of the disclosure may be devised without departing from the basic scope thereof. It is understood that various embodiments described herein may be utilized in combination with any other embodiment described, without departing from the scope contained herein. Further, the foregoing description is not intended to be exhaustive or to limit the disclosure to the precise form disclosed. Modifications and variations are possible in light of the above teachings or may be acquired from practice of the disclosure.

The invention claimed is:

1. A method to conduct a 3-D virtual collaboration session by use of a 3-D server, comprising:
   selecting, by use of a processor, participants and a meeting location for the 3-D virtual collaboration session;
   receiving confirmation that a gateway instance has been established by one or more of the selected participants;
   notifying the 3-D server of the selections of participants and the meeting location;
   scanning one or more of the selected participants for characteristic information;
   instructing the 3-D server to start and to load the characteristic information;
   instructing the 3-D server to take the selected participants to the meeting location and begin the 3-D virtual collaboration session in a 3-D virtual collaboration environment; and
   when the 3-D virtual collaboration session terminates, teleportinq documents and all related information from the 3-D server to a 2-D server for use by the selected participants in a 2-D federated collaboration environment.

2. The method of claim 1, wherein the characteristic information comprises participant information.

3. The method of claim 1, further comprising scanning the 3-D server for collaboration content.

4. The method of claim 3, wherein the collaborative content comprises textual document files.

5. The method of claim 3, wherein the collaborative content comprises audio data files.

* * * * *

UNITED STATES PATENT AND TRADEMARK OFFICE
CERTIFICATE OF CORRECTION

| | |
|---|---|
| PATENT NO. | : 8,645,467 B2 |
| APPLICATION NO. | : 13/763743 |
| DATED | : February 4, 2014 |
| INVENTOR(S) | : Wu Chou |

It is certified that error appears in the above-identified patent and that said Letters Patent is hereby corrected as shown below:

IN THE CLAIMS:

Column 12; Lines 41-42 - "teleportinq" should read -- teleporting --

Signed and Sealed this
Twenty-fourth Day of February, 2015

Michelle K. Lee
*Deputy Director of the United States Patent and Trademark Office*